(12) United States Patent
Solntsev et al.

(10) Patent No.: US 8,602,088 B2
(45) Date of Patent: Dec. 10, 2013

(54) COOLING AIR SUPPLY FOR THE COOLING OF DIFFERENT SYSTEMS REQUIRING COOLING AIR IN AN AIRCRAFT

(75) Inventors: Alexander Solntsev, Hamburg (DE); Holger Bammann, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 1674 days.

(21) Appl. No.: 10/582,151

(22) PCT Filed: Dec. 30, 2004

(86) PCT No.: PCT/EP2004/014845
§ 371 (c)(1),
(2), (4) Date: Jun. 8, 2006

(87) PCT Pub. No.: WO2005/063569
PCT Pub. Date: Jul. 14, 2005

(65) Prior Publication Data
US 2007/0117501 A1     May 24, 2007

(30) Foreign Application Priority Data
Dec. 30, 2003   (DE) .................................. 103 61 657

(51) Int. Cl.
*B60H 1/00*   (2006.01)
*F25D 9/00*   (2006.01)
*B64D 33/02*  (2006.01)
*B64D 11/00*  (2006.01)
*B64G 1/48*   (2006.01)

(52) U.S. Cl.
USPC .................. 165/41; 165/44; 62/401; 62/402; 244/53 B; 244/117 A; 244/118.5

(58) Field of Classification Search
USPC .............. 165/41, 44; 62/401, 402; 244/118.5, 244/117 A, 53 B; 237/2 A
See application file for complete search history.

(56) References Cited

U.S. PATENT DOCUMENTS

| 2,189,895 | A | * | 2/1940 | Grutzner | 237/2 A |
| 2,412,110 | A | * | 12/1946 | Williams, Jr. | 237/2 A |
| 3,265,331 | A | * | 8/1966 | Miles | 244/53 B |
| 3,486,435 | A | * | 12/1969 | Holt | 454/71 |
| 3,752,422 | A | * | 8/1973 | Runnels et al. | 244/118.5 |
| 4,674,704 | A | | 6/1987 | Altoz et al. | |
| 4,737,170 | A | | 4/1988 | Searle | |

(Continued)

FOREIGN PATENT DOCUMENTS

JP        06008889 A        1/1994

OTHER PUBLICATIONS

Forms PCT/ISA/210, 220, 237 International Search Report for PCT/EP2004/014845, mailed May 4, 2005.

*Primary Examiner* — Ljiljana Ciric
(74) *Attorney, Agent, or Firm* — Wood, Herron, Evans, LLP

(57) ABSTRACT

A cooling air supply system for an aircraft is configured to supply cooling air from the surroundings of the aircraft to at least two devices requiring cooling air (38, 44, 56) within the aircraft. The cooling air supply system includes an air inlet, an air channel communicating with the air inlet, and an air distribution device for the distribution of air from the air channel to the at least two devices requiring cooling air. The air inlet is sized to provide sufficient air flow to accommodate a maximum cooling air requirement of the at least two devices requiring cooling air.

20 Claims, 1 Drawing Sheet

(56) References Cited

U.S. PATENT DOCUMENTS

| | | | |
|---|---|---|---|
| 4,742,760 A * | 5/1988 | Horstman et al. | 244/118.5 |
| 4,819,720 A * | 4/1989 | Howard | 165/41 |
| 4,865,267 A * | 9/1989 | Severson | 244/53 B |
| 5,357,742 A * | 10/1994 | Miller | 244/53 B |
| 5,386,952 A * | 2/1995 | Nordstrom et al. | 244/118.1 |
| 6,189,324 B1 * | 2/2001 | Williams et al. | 62/402 |
| 6,422,018 B1 * | 7/2002 | Tisdale et al. | 62/259.1 |
| 6,491,254 B1 * | 12/2002 | Walkinshaw et al. | 244/118.5 |
| 7,029,065 B2 * | 4/2006 | Laib | 297/180.13 |
| 8,336,610 B2 * | 12/2012 | Centofante et al. | 244/118.5 |
| 8,347,647 B2 * | 1/2013 | McAuliffe et al. | 62/401 |
| 8,418,495 B2 * | 4/2013 | Merritt et al. | 62/402 |
| 8,505,852 B2 * | 8/2013 | Janeke | 244/53 B |
| 2002/0152765 A1 * | 10/2002 | Sauterleute et al. | 62/401 |
| 2002/0166923 A1 | 11/2002 | Munoz et al. | |
| 2003/0177780 A1 * | 9/2003 | Brutscher et al. | 62/172 |
| 2005/0011217 A1 * | 1/2005 | Brutscher et al. | 62/402 |
| 2005/0115249 A1 * | 6/2005 | Haas et al. | 62/401 |

* cited by examiner

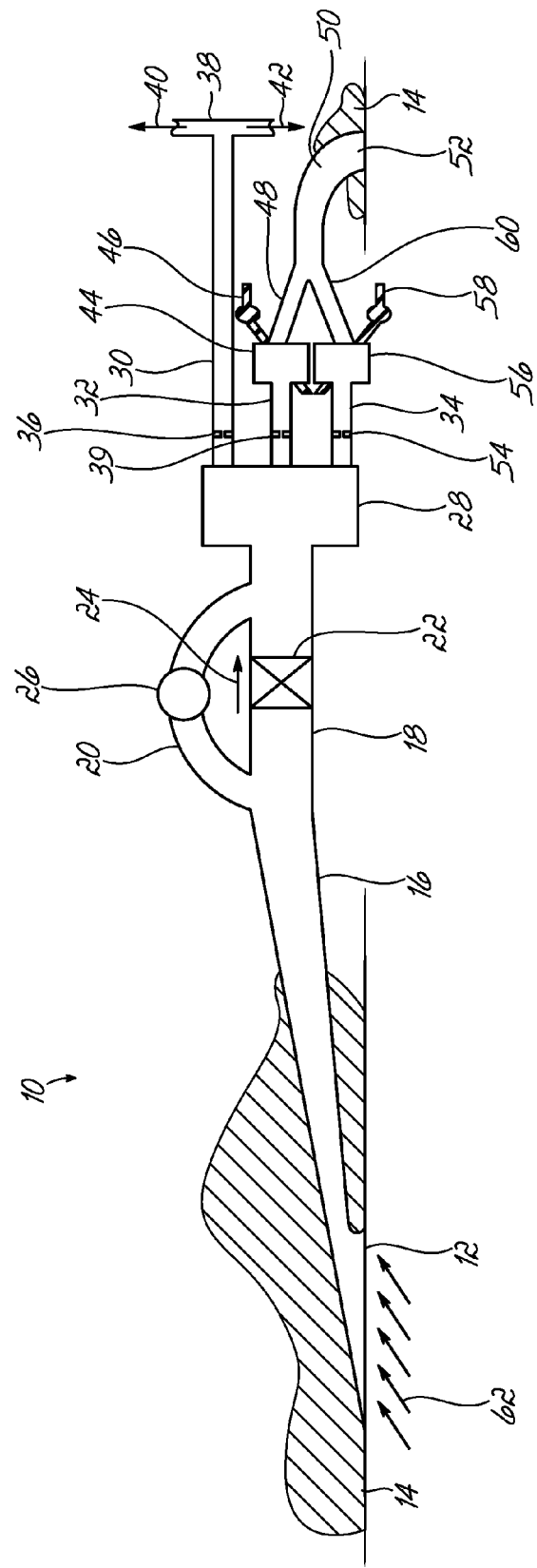

COOLING AIR SUPPLY FOR THE COOLING OF DIFFERENT SYSTEMS REQUIRING COOLING AIR IN AN AIRCRAFT

TECHNICAL FIELD

This invention relates to a cooling air supply system for an aircraft which supplies cooling air from the surroundings of an aircraft to at least two devices requiring cooling air within the aircraft.

BACKGROUND

In the field of aircraft construction, it is necessary to provide different functional units within the aircraft with cooling air. In the past, in order to meet the different requirements of the devices requiring cooling air within the aircraft, separate cooling air supply systems were provided adapted to each individual device requiring cooling air respectively. In this way, the individual devices requiring cooling air were supplied with sufficient quantities of cooling air, however this led to sophisticated cooling air supply systems, which all together significantly added to the weight of the aircraft, as well as associated high manufacture and maintenance costs. Moreover, several air inlets and air outlets had to be provided in the outer skin of the aircraft which weakened the aircraft structure and which led to relatively high additional air resistance (drag) of the aircraft. Finally, as a result of the different cooling air supply systems, a considerable amount of structural space within the aircraft interior was taken up.

In response to this, it is an object of this invention to provide a cooling air supply system of the type indicated above, which can be produced so as to avoid the disadvantages with regard to the current state of the art technology described above, with a high level of efficacy and at low cost.

SUMMARY OF THE INVENTION

This object is solved by a cooling air supply system for an aircraft which supplies cooling air from the surroundings of the aircraft to at least two devices within the aircraft requiring cooling air, whereby the cooling air supply system has an air inlet, an air channel communicating with the air inlet and an air distribution device for the distribution of air to at least two devices requiring cooling air. With the cooling air supply system in accordance with the invention, an air inlet is also supplied which is designed in such a way that it covers the maximum cooling air requirement of the at least two devices requiring cooling air.

In accordance with the invention, therefore, the devices requiring cooling air can be supplied with cooling air by means of one and the same air inlet and by means of an integrated cooling air supply system. In this way, the disadvantages of the current state of the art technology, described above, and associated with the provision of several separate cooling air supply systems, can be effectively eliminated. In particular, by means of the integrated cooling air supply system in accordance with the invention, a large number of components are no longer required, and so there is a considerable reduction in the system weight of the cooling system. Due to the fact that just one air inlet is required, the additional air resistance of the aircraft (drag) can also be considerably reduced. In addition, it also means that there is less weakening of the aircraft structure than is the case with the state of technology described above. Finally, the cooling air supply system in accordance with the invention also offers advantages with regard to simpler installation and maintenance.

Another development of the cooling air supply system in accordance with the invention proposes that the air inlet is in the form of an NACA air inlet in an outer skin of the aircraft. As is known, an NACA (National Advisory Committee for Aeronautics) air inlet has relatively low air resistance with, at the same time, high air intake performance. In connection with this it should also be mentioned that the applicant has recognised that a larger NACA air inlet is more efficient that a number of smaller NACA air inlets, as used in the current state of the art technology for the different cooling air supply systems.

An advantageous further embodiment of the invention proposes that the air channel communicating with the air inlet has a diffuser. In the diffuser, the air entering through the ram air inlet at high speed is slowed down. In this way, the kinetic energy of the air entering through the ram air inlet at high speed is transformed into static energy and pressure recovery is achieved.

In order to be able to guarantee a sufficient supply of cooling air, even when an aircraft is on the ground, a further development of the invention proposes that at least one air compressor, preferably a ventilator, is provided in the diffuser or in one of the first bypass lines leading off of the diffuser. In this way, cooling air can be sucked from the air compressor via the diffuser and be supplied to the devices to be cooled. The air compressor can be electrically powered or be in the form of a turbo-compressor.

In accordance with another development of the invention, a check valve is provided in the diffuser or in one of the second bypass lines leading off from the diffuser, and this blocks cooling air so that it does not flow back into the diffuser. Preferably the first bypass line and the second bypass line are arranged in parallel so that undesired flowing back of cooling air which was sucked in from the aircraft surroundings by the air compressor, can be prevented.

In accordance with the invention, it can also be arranged for a cooling air collection chamber to be connected to the diffuser, preferably downstream of the parallel arrangement of the first and second bypass lines. Moreover, at least one cooling air supply line can be positioned between the cooling air collection chamber and each of the devices requiring cooling air. In order to be able to carry out distribution of cooling air which corresponds to the devices requiring cooling air, a further development of the invention proposes that the cooling air supply line is provided with a throttle device, preferably with a shutter. The throttle device can be variably adjustable. Alternatively, it is also possible to adapt the throttle device, especially the shutter, to the different devices requiring cooling air at the time of installation.

In accordance with the invention, the devices requiring cooling air can be the ventilation device for an unpressurized (pressure-free) air-conditioned space (Unpressurized Bay Ventilation; UBV) and/or an On Board Oxygen Generation System (OBOGS) and/or an On Board Inert Gas Generation System (OBIGGS). In connection with this and within the framework of advantageous further developments of the invention, it is also possible for the device requiring cooling air, in particular the on board oxygen generation system (OBOGS) and/or the on board inert gas generation system (OBIGGS) to have a heat exchanger which uses the cooling air in order to expel heat.

With regard to the cooling air output, there is a further development of the cooling air supply system in accordance with the invention which proposes that at least two, preferably all of the devices requiring cooling air are connected to a common cooling air outlet by means of expelled air pipes.

The invention also relates to an aircraft which is designed with a cooling air supply system of the type described above.

BRIEF DESCRIPTION OF THE DRAWING

In the following, an example of this invention is described with reference to the attached FIGURE in which a cooling air supply system 10 in accordance with the invention is schematically represented.

DETAILED DESCRIPTION

The cooling air supply system 10 in accordance with the invention includes an NACA air inlet 12 which is positioned in the outer skin of the aircraft 14. The NACA air inlet 12 leads to a diffuser 16, at the end of which is a line section 18 and a bypass channel 20 in the style of a parallel arrangement. In the line section 18 a check valve 22 is positioned, and this permits flow in the direction of the arrow 24, but blocks flow in the opposite direction. A turbo compressor 26 is provided in the bypass channel 20 which, when powered, also causes air to flow in the direction of the arrow 24.

A cooling air collection chamber 28 joins onto the line section 18. Several cooling air supply lines 30, 32 and 34 lead off of this collection chamber 28 in parallel.

During flight operations when the aircraft is at cruising altitude, ambient air at a temperature of approx. −50° C. flows into the NACA air inlet 12 in accordance with the arrows 62. The ambient air enters the diffuser 16 via the NACA air inlet 12 and flows through the check valve 22 into the collection chamber 28.

During ground operation, cooling air is conveyed via the diffuser 16 into the collection chamber 28 by means of the turbo compressor 26, whereby the check valve 22 prevents the cooling air from flowing back into the atmosphere.

The cooling air supply line 30 has a firmly installed shutter 36 (i.e., throttling device) close to its interface with the collection chamber 28, and this limits its flow cross-section. It leads to a supply system 38 by means of which the ventilation device of an unpressurized air-conditioned space (unpressurized bay ventilation; UBV) is supplied with cooling air in accordance with arrows 40 and 42.

The cooling air supply line 32 also has a firmly installed shutter 39 which limits its flow cross-section. It takes cooling air from the collection chamber 28 to a heat exchanger 44 which is assigned to an on board oxygen generation system (OBOGS). By means of the heat exchanger 44, a heated fluid conveyed in a line 46 of the on board oxygen generation system can expel heat into the cooling air. The heated cooling air is then led away from the heat exchanger 44 via an expelled air pipe 48, and taken into an air outlet pipe 50. The air output pipe 50 ends at an air outlet 52 which is also provided in the outer skin of the aircraft 14 and which opens into the surroundings of the aircraft.

The cooling air supply line 34 also has a shutter 54. It leads to another heat exchanger 56 which is assigned to an on board inert gas generation system (OBIGGS). By means of the heat exchanger 56, heated fluid conveyed by a line 58 of the on board inert gas generation system (OBIGGS) can be cooled, and its heat can be expelled into the cooling air flowing through the heat exchanger 56. The heated cooling air which comes out of the heat exchanger 56 is then taken via an expelled air pipe 60 into the air output pipe 50 and can exit into the atmosphere by means of the common air outlet 52.

The invention makes it possible to provide a cooling air supply system which only requires one single air inlet and one single air outlet and yet still provides sufficient cooling air in order to supply a number of different devices requiring cooling air with a sufficient amount of cooling air. This means that the disadvantages, as described at the start with reference to the current state of technology, can be avoided. In particular, the cooling air supply system in accordance with the invention can be of relatively low system weight. Moreover, the cooling air supply system in accordance with the invention leads to just a slight increase in the air resistance of the aircraft and to an insignificant weakening of the aircraft structure due to the fact that it only has one single air inlet and one single air outlet. Due to the simplified design of the system in accordance with the invention, it can be produced cheaply, and can be installed more easily and at a low cost.

The invention claimed is:

1. A cooling air supply system configured to supply cooling air from the surroundings of an aircraft to at least two devices requiring cooling air within the aircraft, the cooling air supply system comprising:
   an air inlet,
   an air channel communicating with the air inlet,
   an air distribution device configured to distribute air from the air channel directly to the at least two devices requiring cooling air, the air distribution device being located downstream from the air channel and upstream from the at least two devices requiring cooling air, and
   at least one shutter disposed in the air distribution device and configured to throttle the distribution of air from the air channel
to the at least two devices requiring cooling air,
   whereby the air inlet is sized to provide sufficient air flow to accommodate a maximum cooling air requirement of the at least two devices requiring cooling air.

2. The cooling air supply system of claim 1, characterized in that the air inlet is located in an outer skin of the aircraft.

3. The cooling air supply system of claim 1, characterized in that the air channel communicating with the air inlet includes a diffuser.

4. The cooling air supply system of claim 3, further comprising:
   at least one air compressor located in the diffuser or in a first bypass line leading off from the diffuser.

5. The cooling air supply system of claim 4, characterized in that the at least one air compressor is a turbo-compressor.

6. The cooling air supply system of claim 4, further comprising:
   a check valve provided in the diffuser or in a second bypass line leading off from the diffuser, the check valve preventing the cooling air from flowing back into the diffuser.

7. The cooling air supply system of claim 6, characterized in that the first bypass line and the second bypass line are arranged in parallel.

8. The cooling air supply system of claim 7, further comprising:
   a cooling air collection chamber located downstream of the diffuser and the first and second bypass lines.

9. The cooling air supply system of claim 8, further comprising:
   at least one cooling air supply line positioned between the cooling air collection chamber and each of the at least two devices requiring cooling air.

10. The cooling air supply system of claim 1, characterized in that a pack bay ventilation system is one of the at least two devices requiring cooling air.

11. The cooling air supply system of claim 1, characterized in that an on board oxygen generation system is one of the at least two devices requiring cooling air.

12. The cooling air supply system of claim 1, characterized in that a heat exchanger which uses the cooling air in order to eliminate heat is one of the at least two devices requiring cooling air.

13. The cooling air supply system of claim 1, further comprising:
air pipes connecting the at least two devices requiring cooling air with a common cooling air outlet.

14. An aircraft comprising:
an outer skin;
at least two devices requiring cooling air; and
a cooling air supply system including:
an air inlet at the outer skin,
an air channel communicating with the air inlet,
an air distribution device configured to distribute air from the air channel directly to the at least two devices requiring cooling air, the air distribution device being located downstream from the air channel and upstream from the at least two devices requiring cooling air, and
at least one shutter disposed in the air distribution device and configured to throttle the distribution of air from the air channel to the at least two devices requiring cooling air,
whereby the air inlet is sized to provide sufficient air flow to accommodate a maximum cooling air requirement of the at least two devices requiring cooling air.

15. The aircraft of claim 14, characterized in that the air channel communicating with the air inlet includes a diffuser, and the cooling air supply system further comprises:
at least one air compressor located in the diffuser or in a first bypass line leading off from the diffuser.

16. The aircraft of claim 15, characterized in that the at least one air compressor is a turbo-compressor.

17. The aircraft of claim 15, characterized in that the cooling air supply system further comprises:
a check valve provided in the diffuser or in a second bypass line leading off from the diffuser, the check valve preventing the cooling air from flowing back into the diffuser.

18. The aircraft of claim 17, characterized in that the first bypass line and the second bypass line are arranged in parallel.

19. The aircraft of claim 18, characterized in that the cooling air supply system further comprises:
a cooling air collection chamber located downstream of the diffuser and the first and second bypass lines.

20. The aircraft of claim 19, characterized in that the cooling air supply system further comprises:
at least one cooling air supply line positioned between the cooling air collection chamber and each of the at least two devices requiring cooling air.

* * * * *